US006552466B2

(12) United States Patent
Schwabbauer et al.

(10) Patent No.: US 6,552,466 B2
(45) Date of Patent: Apr. 22, 2003

(54) WET-RUNNING DIRECT-CURRENT MOTOR HAVING FLUTED BRUSH CONTACT FACES

(75) Inventors: Frank Schwabbauer, Hartha (DE); Reinhard Thienelt, Willich (DE); Ronald Rathke, Döbeln (DE)

(73) Assignee: Pierburg AG, Neuss (DE)

( * ) Notice: Subject to any disclaimer, the term of this patent is extended or adjusted under 35 U.S.C. 154(b) by 0 days.

(21) Appl. No.: 09/745,624

(22) Filed: Dec. 21, 2000

(65) Prior Publication Data

US 2001/0006315 A1 Jul. 5, 2001

(30) Foreign Application Priority Data

Dec. 23, 1999 (DE) ........................................ 199 62 363

(51) Int. Cl.[7] ................................................ H02K 13/00
(52) U.S. Cl. ........................................ 310/248; 310/228
(58) Field of Search ................................ 310/248, 239, 310/240, 241, 242, 245, 246, 247, 219, 227, 228

(56) References Cited

U.S. PATENT DOCUMENTS 3,590,300 A * 6/1971 Moberly ..................... 310/248
4,529,899 A * 7/1985 Mabuchi et al. ...... 310/40 MM
4,983,873 A * 1/1991 Tanaka et al. .............. 310/248
5,280,212 A * 1/1994 Oba ........................... 310/248
5,852,352 A * 12/1998 Suriano ...................... 318/541
5,909,077 A * 6/1999 Bruhn ........................ 310/251
5,932,949 A * 8/1999 Ziegler et al. .............. 310/236

FOREIGN PATENT DOCUMENTS

DE 2531483 5/1977

* cited by examiner

*Primary Examiner*—Dang Dinh Le
(74) *Attorney, Agent, or Firm*—Ladas & Parry

(57) ABSTRACT

A wet-running direct-current motor for a fuel pump having a commutator (2) formed from carbon lamellas (5), and carbon brushes (3) having brush running faces (6) which are fluted in the direction of rotation. The fluting is obtained by curved, parallel ribs of triangular cross-sections whose apexes define the brush running face. The curved ribs have radii offset from the curvature of the commutator surface, the offset being achieved by offset of the center of the radius of each rib in a direction counter to the direction of relative rotation of the commutator and brushes. The motor is rendered usable for fuel pumps of diesel engines.

3 Claims, 2 Drawing Sheets

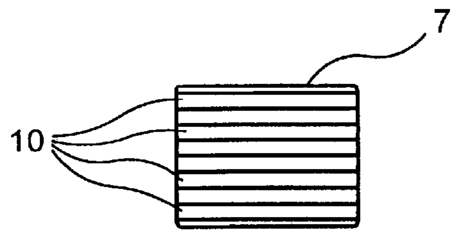
F I G. 2
F I G. 3
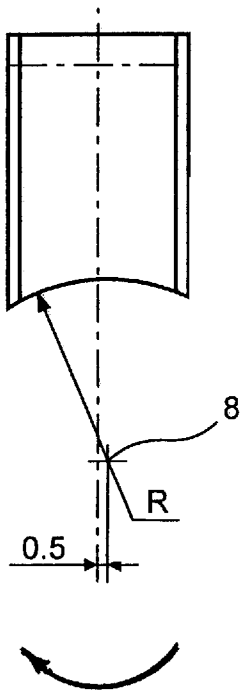
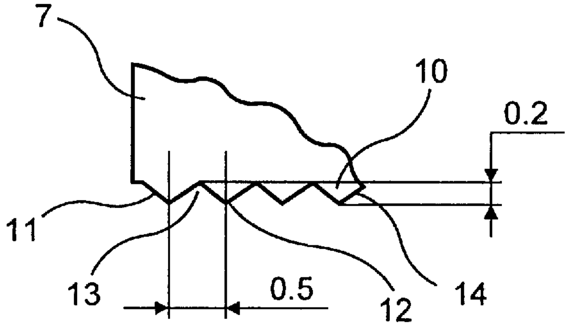
F I G. 4

WET-RUNNING DIRECT-CURRENT MOTOR HAVING FLUTED BRUSH CONTACT FACES

FIELD OF THE INVENTION

The invention relates to a wet-running direct-current motor for a fuel pump of an internal combustion engine of a motor vehicle.

BACKGROUND AND PRIOR ART

German Patent DE 2531483 A1 discloses that severe brush wear can take place in these fuel pumps as a result of turbulence and the formation of a liquid wedge or cavitation between the brushes and the commutator of the motor.

It has therefore already been proposed that the commutator contact face be provided with a certain surface roughness, so that direct contact between the brushes and the commutator is preserved.

It has now been found, however, that fuel pumps with such construction are not suitable for pumping diesel fuel, especially biodiesel fuel, since they do not satisfy the useful life requirements of the motor vehicle manufacturers.

SUMMARY OF THE INVENTION

An object of the invention is therefore to provide means by which such a wet-running motor can be made suitable for use as a diesel fuel pump with a long useful life.

This object is achieved by the construction of a wet-running direct current motor for a fuel pump for an internal combustion engine, in which the commutator is formed from carbon lamellas and the brushes are made of carbon and the contact face of each brush is fluted or striated in the direction of rotation of the commutator.

It is a feature of the invention that the brush contact face is curved and has a radius whose center is offset in a direction counter to the direction of rotation of the commutator.

It is a further feature of the invention that the offset of the radius center is about 0.5 mm.

It is a further feature of the invention that the fluting of the brush contact face is formed by ribs disposed in parallel relation, the ribs having triangular cross-sections with apexes forming the brush contact surface.

It is a further feature of the invention that the apexes of the ribs have a spacing of about 0.5 mm from one another and the height of the apexes is about 0.2 mm.

BRIEF DESCRIPTION OF THE DRAWING

A practical embodiment of the invention will be described hereinafter with reference to the drawing, wherein

FIG. 2 is a front view of a brush contact surface of the motor;

FIG. 3 is a top view of the brush; and

FIG. 4 is a side, elevational view of the brush.

DETAILED DESCRIPTION

Figure 1:
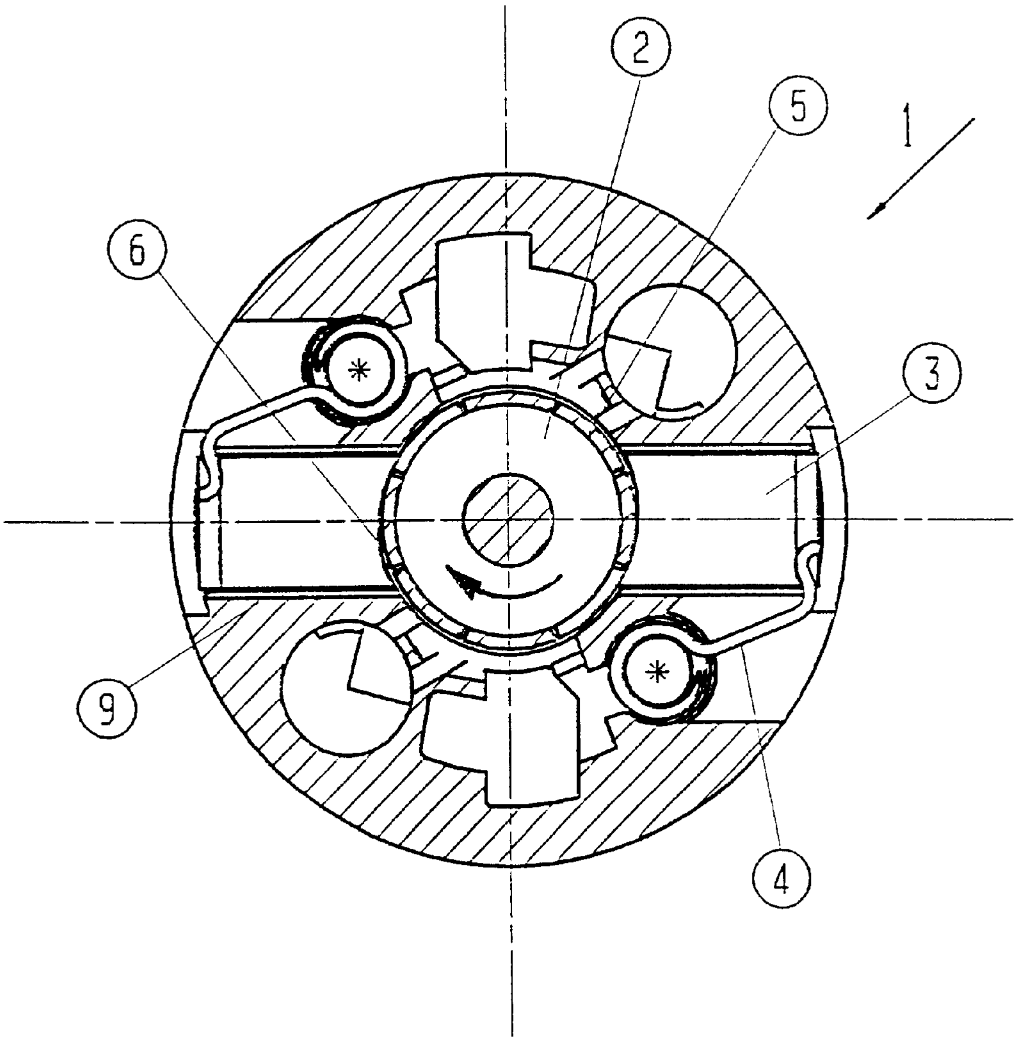
FIG. 1 is a cross section of a direct-current motor for a fuel pump of an internal combustion engine.

FIG. 1 shows a cross section through a wet-running direct-current motor 1, for a fuel pump for an internal combustion engine. The motor 1 has a commutator 2 and carbon brushes 3 in contact with the commutator.

The carbon brushes 3 are urged by respective springs 4 against commutator 2. The direct-current motor 1 as well as the fuel pump (not illustrated) are disposed in a housing (not illustrated), and fuel is pumped through the motor and the pump.

According to the invention, the commutator 2 is formed from carbon lamellas or segments 5, and carbon brushes 3 each has a brush contact face 6 which is grooved to form a fluted or striated face in the direction of rotation of the commutator as shown by the arrow in FIG. 1. Instead of the commutator rotating, the brushes can rotate, the relative rotation remaining in the direction of the arrow in FIG. 1.

A very favorable material pairing of graphite-to-graphite is achieved by these features, while the brush pressure per unit area is very high by virtue of fluting 7 of the brush contact face 6. Thus, floating of brushes 3 is prevented and optimal current transmission is achieved. Fluting 7 disposed in the direction of rotation (arrow) ensures lubrication between the contacting faces of commutator 2 and carbon brushes 3, whereby any brush sparking that might occur is suppressed.

In a particularly advantageous embodiment, the center of the radius of brush contact face 6 has an offset 8 (FIG. 3) counter to the direction of rotation, whereby carbon brush 3, despite its skewed position, inside a carbon guide 9 can bear with its entire face 6 against commutator 2.

The fluting of the brush contact face 6 is achieved by ribs 10 disposed in parallel relation (FIG. 2), the ribs each having a triangular cross-section 11 (FIG. 4), with an apex 12 in the region of the brush contact face 6.

In a particular embodiment, the ribs 10 have a spacing 13 of about 0.5 mm from one another, an apex height of about 0.2 mm, and an offset 8 of the radius center of about 0.5 mm.

Although the invention is disclosed with reference to particular embodiments thereof, it will become apparent to those skilled in the art that numerous modifications and variations can be made which will fall within the scope and spirit of the invention as defined by the attached claims.

What is claimed is:

1. A wet-running direct-current motor for a fuel pump for an internal combustion engine, comprising a commutator and a plurality of carbon brushes having running faces in contact with the commutator, said commutator being formed from carbon lamellas, said running face of each brush being fluted in a direction of relative rotation between the commutator and the brushes, said brush running face having a curved surface with a radius whose center has an offset directed counter to said direction of relative rotation, said fluting extending over the entire surface of the running face and being of the brush running face formed by ribs disposed in parallel relation over said entire running face, the ribs having triangular cross-sections with apexes forming the brush running face, said ribs having a spacing of 0.5 mm from one another and an apex height of 0.2 mm.

2. The direct-current motor according to claim 1, wherein the offset of the radius center is 0.5 mm.

3. The direct-current motor according to claim 1, in which the fuel pumps is adapted to pumps diesel fuel to the internal combustion engine with a long life.

* * * * *